US005826023A

United States Patent [19]
Hall et al.

[11] Patent Number: 5,826,023
[45] Date of Patent: Oct. 20, 1998

[54] COMMUNICATIONS TUNNELING

[75] Inventors: Mary Susan Hall, Vestal, N.Y.; George James Romano, Rochester, Minn.

[73] Assignee: International Business Machines Corporation, Armonk, N.Y.

[21] Appl. No.: 657,140

[22] Filed: Jun. 3, 1996

[51] Int. Cl.$^6$ .............................. G06F 13/38; G06F 15/17
[52] U.S. Cl. .................................. 395/200.36; 395/200.7; 370/410
[58] Field of Search ........................ 370/402, 397, 370/401, 410; 395/200.36, 200.79, 200.68, 200.69, 200.7, 200.73

[56] References Cited

U.S. PATENT DOCUMENTS

| | | | |
|---|---|---|---|
| 4,893,307 | 1/1990 | McKay et al. | 370/94.1 |
| 5,058,110 | 10/1991 | Beach et al. | 370/85.6 |
| 5,119,465 | 6/1992 | Jack et al. | 395/500 |
| 5,202,977 | 4/1993 | Pasetes, Jr. et al. | 395/500 |
| 5,251,205 | 10/1993 | Callon et al. | 370/60 |
| 5,283,887 | 2/1994 | Zachery | 395/500 |
| 5,309,437 | 5/1994 | Perlman et al. | 546/619 |
| 5,333,266 | 7/1994 | Boaz et al. | 395/200 |
| 5,406,557 | 4/1995 | Baudoin | 370/61 |
| 5,430,727 | 7/1995 | Callon | 370/85.13 |
| 5,446,896 | 8/1995 | Hegarty et al. | 395/650 |
| 5,448,558 | 9/1995 | Gildea et al. | 370/60 |
| 5,548,646 | 8/1996 | Aziz et al. | 380/23 |
| 5,577,202 | 11/1996 | Padgett | 395/200.36 |
| 5,581,558 | 12/1996 | Horney, II et al. | 370/401 |
| 5,623,605 | 4/1997 | Keshav et al. | 395/200.17 |
| 5,680,551 | 10/1997 | Martino | 395/200.15 |

FOREIGN PATENT DOCUMENTS

0700231 A2   6/1996   European Pat. Off. .

Primary Examiner—Mark H. Rinehart
Attorney, Agent, or Firm—Shelley M. Beckstrand

[57] ABSTRACT

AS/400 POP3/MIME clients that are making use of the POP3 server support move mail through a SNADS network to other POP3 clients. The messages sent between these clients make use of an existing SNADS network without having to resort to converting or mapping or breaking apart an ASCII SMTP/MIME text message to an equivalent OfficeVision/400 format. Likewise, non-text SMTP/MIME messages or attachments sent this way do not need to be mapped to OfficeVision/400 PC file objects. This is accomplished by encapsulating the SMTP/MIME message in an AS/400 Object Distribution as a specific database object. Once encapsulated, the SMTP/MIME message is an object distribution message as far as any reference to that message made by any SNADS function anywhere in the SNADS network. When an encapsulated SMTP/MIME message reaches the destination system, the encapsulation is stripped away and the SMTP/MIME message handled and recognized as a delivery to a POP3 client by the SMTP/MIME and POP3 server support at that destination system. Optionally, the SMTP/MIME message can also be transformed into an OfficeVision/400 (OV) message at that destination system.

9 Claims, 8 Drawing Sheets

COMMUNICATIONS TUNNELING

BACKGROUND OF THE INVENTION

1. Technical Field of the Invention

This invention relates to electronic mail communications, and more particularly to encapsulating and tunneling messages through a network.

2. Background Art

Modern mail clients accessing the internet from personal computers (PC) use Transmission Control Protocol/Internet Protocol (TC/PIP) to send mail. Such clients typically use the Post Office Protocol/Multi-purpose Internet Mail Extensions (POP3/MIME).

Other clients, such as most users of IBM System AS/400, are connected to System Network Architecture Distribution Services (SNADS) networks. Sending multimedia mail from a PC mail client through AS/400 servers connected by SNADS would normally involve breaking apart a multiple attachment message and converting the text attachments to Office Vision/400 (OV) format. The mail arrives on another client's system in many pieces. Extra processing is then required for the conversions. Because text attachments are mapped to OV form and then returned to the original client's form, some information could be lost.

It is, therefore, an object of this invention to provide a system and method for moving messages formatted in accordance with a first protocol through a communication system architected in accordance with a second protocol without loss of information and without transforming, mapping or converting the messages from, for example, ASCII to EBCDIC.

It is a further object of this invention to provide a system and method for moving mail through a SNADS network from one POP3/MIME client to another POP3/MIME client without loss of information.

It is still a further object of this invention to move multipart MIME format messages through a SNADS network without breaking that message into multiple, single attachment, SNADS messages.

It is a further object of this invention to support existing OV or other distribution usage without causing failure of its SNADS functions, including SNADS routes, distribution queues (for both normal SNADS and its bridges) and secondary system name tables.

It is a further object of this invention to provide for message encapsulating within a network of SNADS systems.

It is a yet further object of this invention to provide a tunneling process which executes at the application level (the e-mail application), and achieves the tunneling effect without altering the network at the physical level (such as by adding configurations of new terminals to a network definition).

SUMMARY OF THE INVENTION

This invention provides a system and method for tunneling messages of a first protocol through a communication system of a second protocol responsive to a directory of e-mail addresses configured with a tunneling attribute.

This invention provides a system and method for communicating a first message in a first format through a network transport requiring messages in a second format. At a sending node, a directory of addresses is maintained which includes tunneling attributes. Responsive to an application request to send a first message to a destination client, the directory of addresses is searched for the tunneling attribute for the destination client. Responsive to the tunneling attribute, the first message is encapsulated without conversion within a second message of the second format, and the second message is communicated to the receiving node. At the receiving node, the second message is deencapsulated to recover therefrom the first message.

Other features and advantages of this invention will become apparent from the following detailed description of the presently preferred embodiment of the invention, taken in conjunction with the accompanying drawings.

BRIEF DESCRIPTION OF THE DRAWINGS

FIG. 5 illustrates the construction of a MIME message and its processing by the address resolution snap-in.

FIG. 7 illustrates the encapsulation of a MIME message with a SNADS object distribution message as a result of the determination that the recipient should be tunnled to.

BEST MODE FOR CARRYING OUT THE INVENTION

Tunnelling Through SNADS

In accordance with a specific, preferred embodiment of the invention, to be more fully described hereafter, AS/400 POP3/MIME clients that are making use of the POP3 server support move mail through a SNADS network to other POP3 clients. The messages sent between these clients make use of an existing SNADS network without having to resort to converting or mapping an ASCII SMTP/MIME text message to an equivalent OfficeVision/400 format. Likewise, non-text SMTP/MIME messages or attachments sent this way do not need to be mapped to OfficeVision/400 PC file objects.

By this invention MIME format messages are moved through a SNADS network without having to resort to breaking that message into multiple, single attachment, SNADS messages. Messages are moved through the SNADS network untransformed, unmapped and unconverted from how they originally were created by a POP3 client.

This is accomplished by encapsulating the SMTP/MIME message in an AS/400 SNADS object distribution function's SNADS message as a specific database object. Once encapsulated, the SMTP/MIME message is an AS/400 object distribution function message as far as any reference to that message made by any SNADS function anywhere in the SNADS network.

When a SNADS object distribution encapsulated SMTP/MIME message reaches the destination system, the encapsulation is stripped away and the SMTP/MIME message handled and recognized as a delivery to a POP3 client by the SMTP/MIME and POP3 server support at that destination system. Optionally, the SMTP/MIME message can also be transformed into an OfficeVision/400 (OV) message at that destination system.

This invention also supports existing OV or other distribution usage in an already working SNADS configuration without causing failure of its SNADS functions, including SNADS routes, distribution queues (for both normal SNADS and its bridges) and secondary system name tables.

Figure 1:
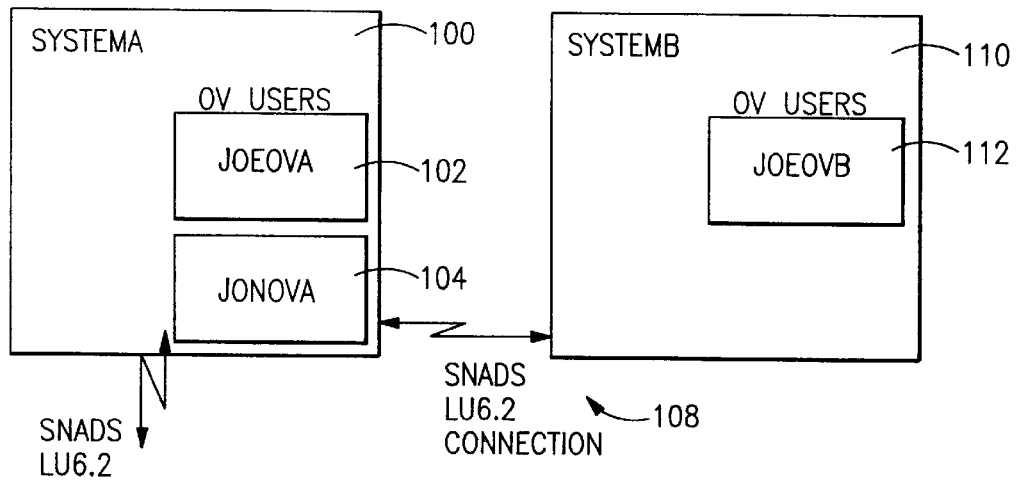
FIG. 1 illustrates a SNADS network used for Office Vision/400 (OV).

Referring to FIG. 1, a simple prior art system network includes system A 100 and system B 110, interconnected by a communications network operable according to a first protocol—in this specific example, a systems network architecture distribution services (SNADS) LU6.2 connection. System A 100 includes office vision (OV) users JOEOVA 102 and JONOVA 104. System B 110 includes OV user JOEOVB 112.

Figure 2:
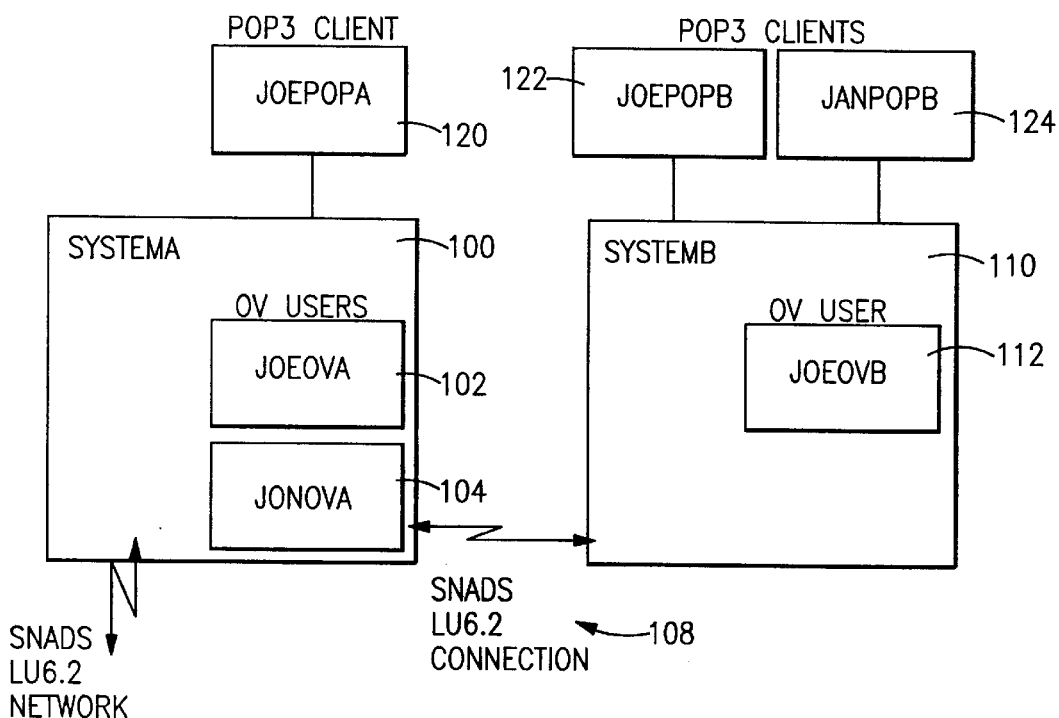
FIG. 2 illustrates a SNADS network used for OV with tunneling clients.

Referring to FIG. 2, the system network of FIG. 1 has added thereto tunneling clients JOEPOPA 120, JOEPOPB 122 and JANPOPB 124. Tunneling clients 120, 122 and 124 communicate with their respective systems 100, 110 in accordance with a second protocol—in this specific example, using POP3/MIME mail. By this invention, there is provided a tunneling system and method for communicating messages according to the second protocol from client 120 to client 112 or 124 over a communication link 108 of the first protocol.

A Simplified Flow Starting at the POP Client

Figure 3:
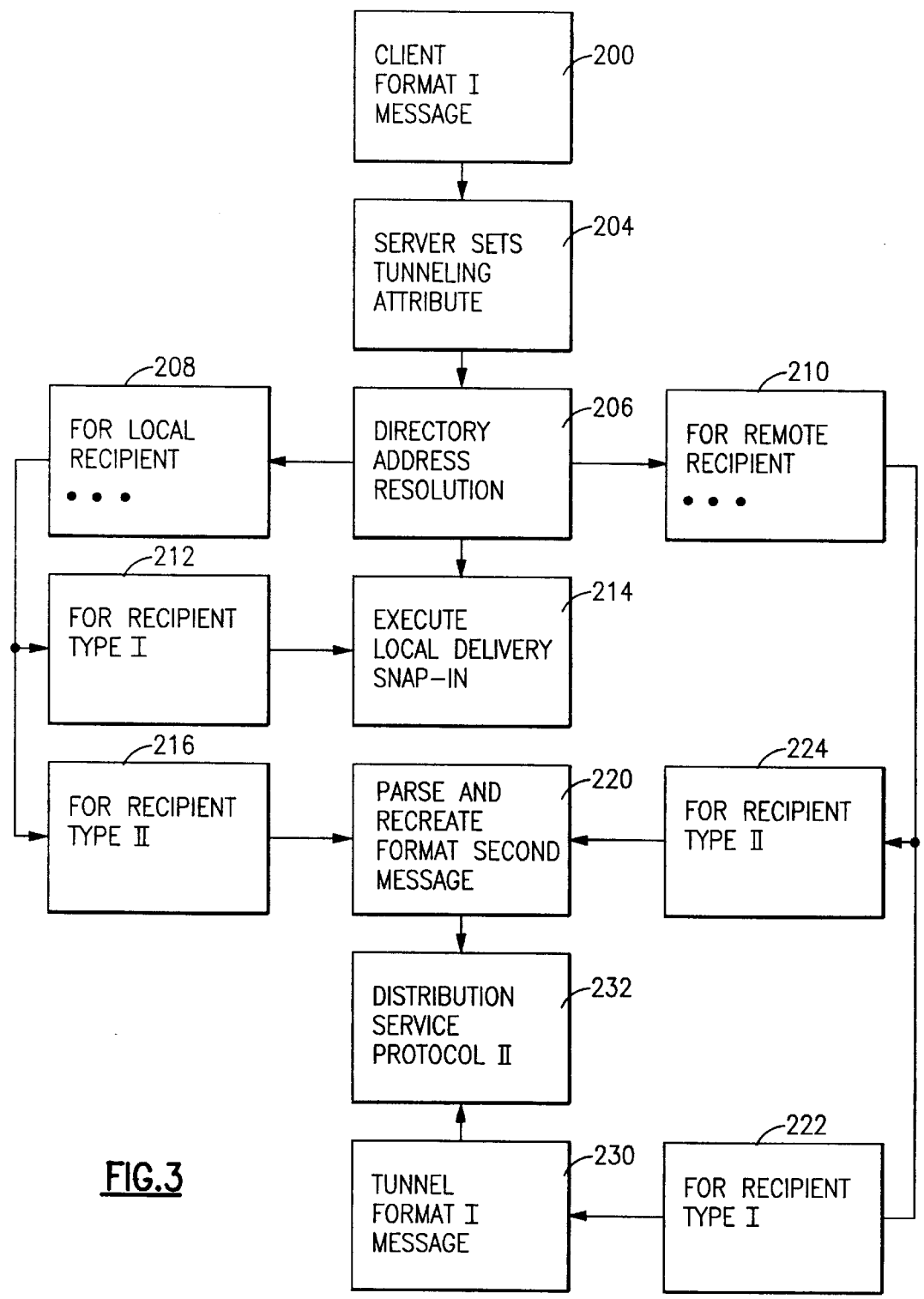
FIG. 3 illustrates method steps of the invention for delivering a message from one local client to another or entering a tunnel.

Referring to FIG. 3, the method of the invention for performing the following functions will be described:

1. Delivering from one local POP3 client 300 to another or to a local OV/400 user using a UserID.Address.
2. Entering a SNADS tunnel from a POP3 client.

As will be more fully described hereafter in connection with FIGS. 5 through 12, in step 200 a client prepares a message according to a first format. In step 204, responsive to the message from step 200 including an address according to format I, the server sets a tunneling attribute, herein a first predetermined address type. In step 206, an address resolution procedure, recognizing this message as attempting to tunnel, accesses a directory to determine if recipient of the message is local or remote.

If local 208, and the recipient is located on the same system as the sending client, then local delivery snap-in 214 is executed and the message delivered. If local 208, and the recipient is a node 216 of a second type, then in step 220 the message is parsed and formatted according the second format type, and communicated to the distribution service for messages according to protocol II at step 232.

If remote 210, and the recipient is a node 224 of the second type, the message is parsed in step 220 to recreate the message according to format II, and communicated to the distribution service for messages of protocol II at step 232.

If remote 210, and recipient node 222 is a tunneled to client according to the first protocol, then the message is tunneled within a SNADS object distribution message in step 230 within a message according to protocol II, and at step 232 communicated to the distribution service.

Figure 4:
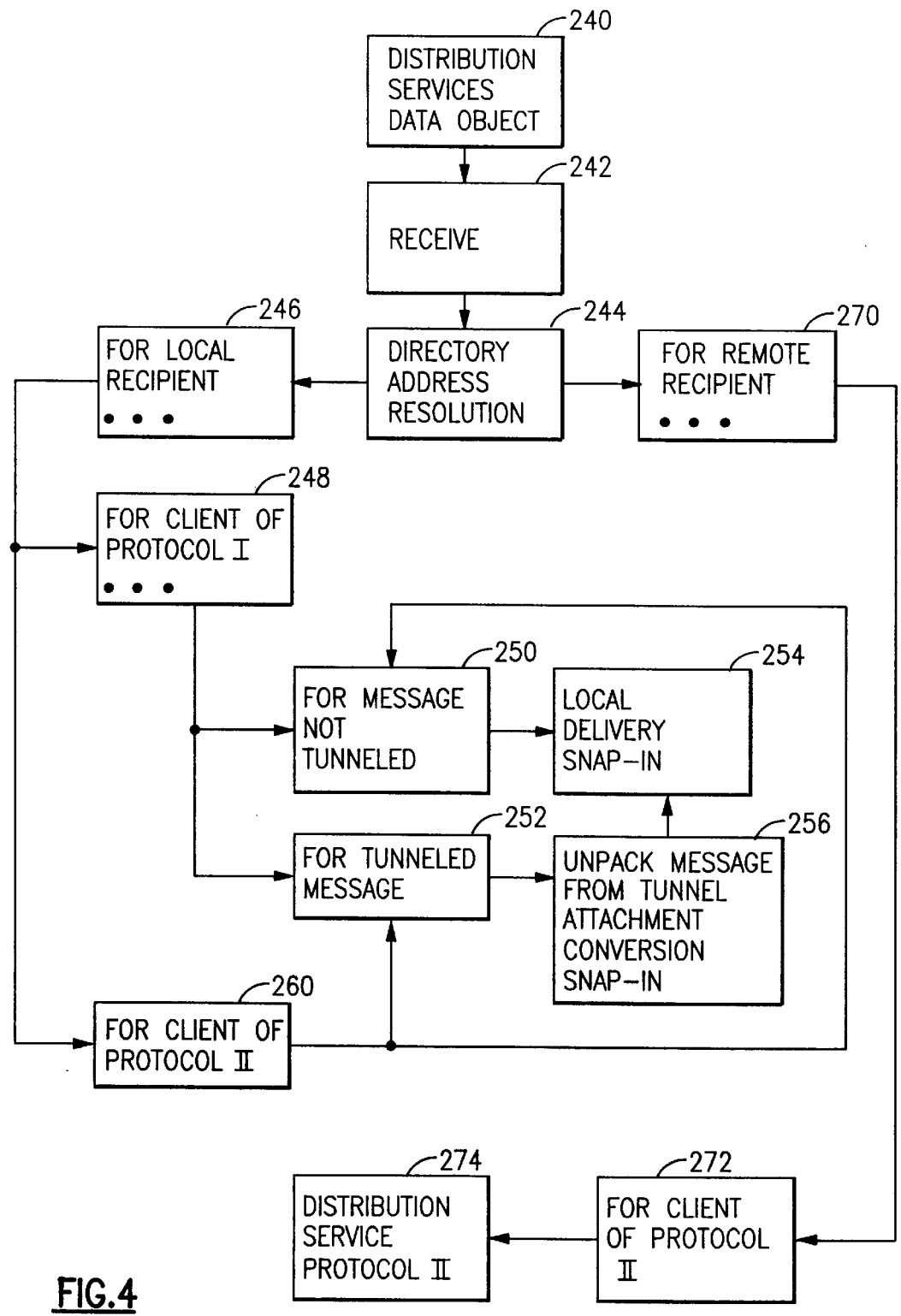
FIG. 4 illustrates the method steps of the invention for exiting a tunnel and delivering a message to a recipient client.

Referring to FIG. 4, a SNADS that contains an object distribution message data object 240 arrives at this server. In step 242, the receive process recognizes this data object as a tunneled message, and in step 244 accesses the directory to resolve the recipient address as local 246 or remote 270.

If local 246, and recipient is a client 248 according to protocol I, then if the message is determined in step 250 as not tunneled, in step 254 the local delivery snap-in (i.e., program call) is executed; if determined in step 252 to be tunneled, in step 256 the attachment conversion snap-in is executed to unpack the message from the tunnel and deliver it to the local delivery snap-in at step 254. If, on the other hand, local recipient 246 is determined in step 260 to be a recipient according to protocol II, then the message is recognized as not tunneled 250, and provided to local delivery snap-in 254.

If remote 270, and in step 272 the recipient node is recognized as of the class of protocol II, then the message is communicated at step 274 to distribution services for protocol II.

In connection with FIGS. 3 through 9, a specific embodiment of the invention for tunneling POP3/MIME client mail through a SNADS network will be described. This embodiment allows an existing SNADS network already in use for OV/400 and/or object distribution function (ODF) to also be used to carry mail between POP3/MIME clients.

What is Tunnelling?

"Tunneling" as used in this embodiment of the invention means that AS/400 POP3/MIME clients that are making use of the POP3 server support be allowed to move mail through a SNADS network to other POP3 clients. The messages sent between these clients make use of an existing SNADS network without having to resort to converting or mapping an ASCII SMTP/MIME text message to an equivalent OV final form text (FFT) document format. Likewise non-text SMTP/MIME messages or attachments sent this way do not have to be mapped to an OV "PC file" objects. Also multipart MIME format messages are moved through a SNADS network without having to resort to breaking that message into multiple, single attachment, SNADS messages. Tunneled messages are moved through the SNADS network essentially "untransformed", "unmapped", and "unconverted" from how they originally were created by a POP3 client.

Tunneling is accomplished by SMTP/MIME messages being "encapsulated" in an ODF SNADS distribution as a specific kind of database object (similar to what would be created if sent with ODF). Once encapsulated as designed, the SMTP/MIME message is an ODF message as far as any reference to that message made by any SNADS function on that encapsulating system or on any other SNADS system.

When an encapsulated SMTP/MIME message reaches a system where untunneling is supported, the encapsulation is stripped away and the SMTP/MIME message is handled and recognized as a delivery to a POP3 client by the SMTP/MIME and POP3 server support at that system. Once untunneled, the SMTP/MIME message can also be transformed into an OV/400 message with "FFT" or "PC file" attachment(s) at that system or, by use of the AnyMail snap-in capability, to anything else that might be able to transform SMTP/MIME messages.

In this specific embodiment, SNADS tunneling is not the "default behavior" when using UserId.Addresses from a POP3 client. The default behavior is to assume that these are truly OV/400 recipients and the MIME messages sent to them are to be converted and split apart as required to be delivered to them as their directory entry might indicate. SNADS tunneling therefore requires some specific, non-default, configuration difference in how UserId.Addresses are enrolled in the SNADS directory. This difference is visible in their configuration and not in the usage of these UserId.Addresses by the POP3 client.

POP3 clients that want to make use of SNADS tunneling can support "native" UserID.Address addressing and can use these addresses directly (for example on the "To:" field) when constructing a message.

If they can't support direct addressing then the POP3 clients that want to make use of SNADS tunneling will require directory configuration at each system to switch the addresses that they do support to their equivalent unique UserID.Address. (This would be similar to the address mapping requirement when sending from POP3 clients to OV/SNADS and a UserID.Address is not used.)

The client's end user interface and POP3 client code does nothing different to request or make use of the tunneling support (no option, no separate messages, no restrictions, no special addressing other than it allows the possible direct use of the OV/SNADS UserID.Address).

In the specific embodiment hereinafter described, the SNADS tunneling function is compatible with the rest of the POP3 server support. This means that it allows mixing and matching of various addressing combinations of SNADS addresses that are both tunneled to and "transformed to OV". Mixing and matching with native SMTP/MIME addresses that are either switched to a UserId/Address or supported directly via SMTP/MIME Address is also allowed. In addition to the above mentioned addresses, some or all recipients are allowed to be local OV/SNADS or POP3 clients.

The use of the SNADS network for tunneling does not require any exceptional configuration (more than what would be required for any "normal" use of SNADS).

Any existing SNADS configuration that might have been in use to support existing OV/ODF usage continues to operate as it would have without tunneling. This means that if it is an already working SNADS configuration no adjustments need be made that might cause the existing configuration to fail to provide its current SNADS function. This extends to all SNADS routes, distribution queues (for both normal SNADS and its bridges) and secondary system name tables that are port of that working SNADS configuration.

By this embodiment of the invention no disruption occurs for any existing SNADS networks where tunneling might take place including: those that have an IBM system AS/400, those that have SNADS nodes other than IBM system AS/400, those that have existing bridge support for VM/MVS, X.400, or SMTP. Thus, "tunneled" SNADS messages do not cause any problems when sending to or through these systems and their bridges.

The use of any existing AS/400 SNADS functions (for example the functions that support SNADS operations) are not affected by the existence of SNADS distributions that are carrying tunneled mail.

Referring to FIGS. 5 through 9, the series of steps used to first determine when an SMTP/MIME message should be tunneled with SNADS and what happens as a consequence on the sending and receiving systems is illustrated. Also illustrated is the method used to tunnel these SMTP/MIME messages within the SNADS network.

Figure 5:
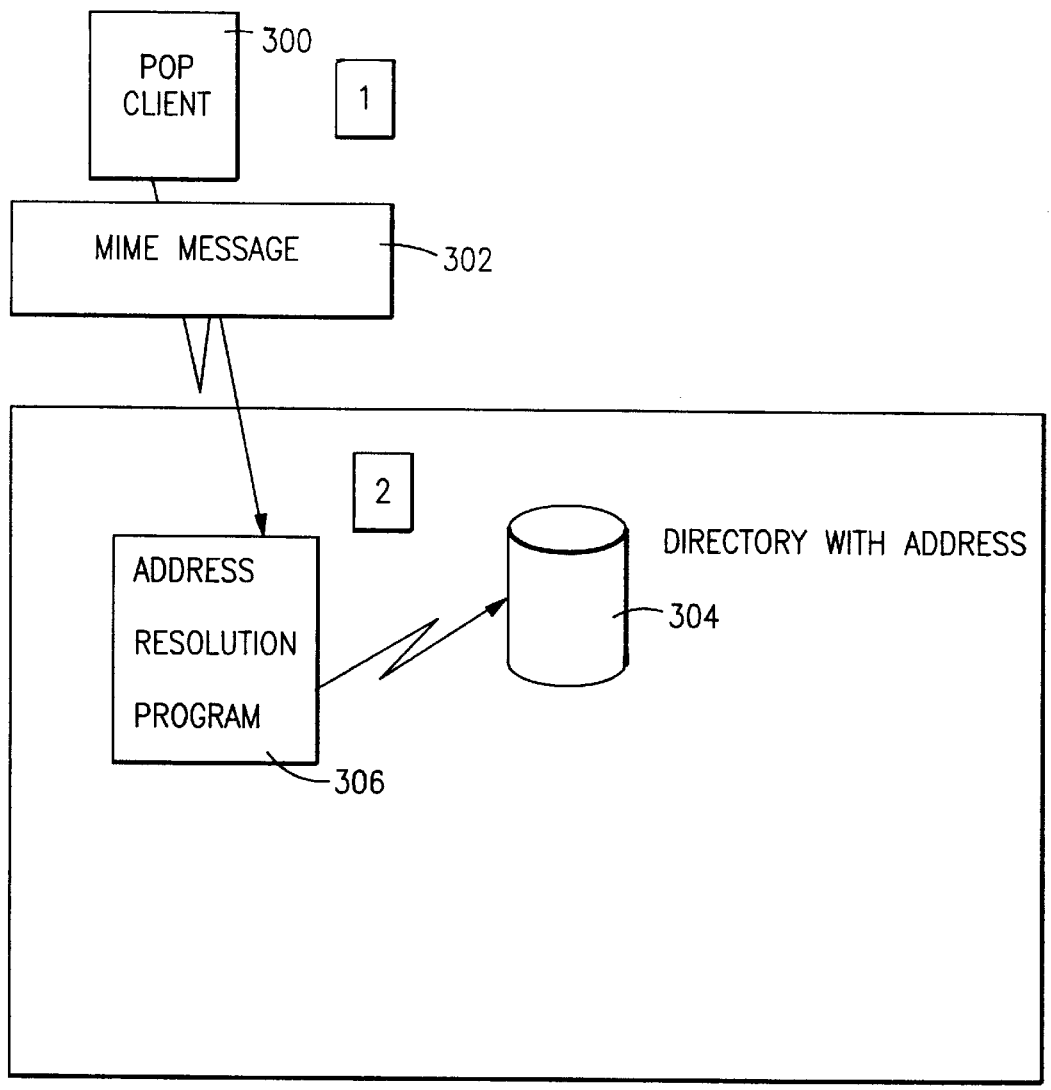

Referring to FIG. 5, in step 1, POP3 client 300 creates a MIME message 302 that has multiple attachments, some of which are non-text attachments, such as images, sound, and so forth. In step 2, the recipient of this message 302 is first identified in directory 304 as having a SNADS recipient e-mail address. This address is, in this embodiment, located in directory 304 by address resolution program 306. A tunnel-to attribute in address directory 304 for a SNADS recipient e-mail address configures that address as one to which MIME messages should be tunneled to. Address resolution program uses the directory 304 entry for the address to determine if the recipient is to be tunneled to or not tunneled to. As a MIME message 302 may have many recipients, each recipient's directory 304 entry is located and individually identified as being tunneled to or not tunneled to.

Figure 6:
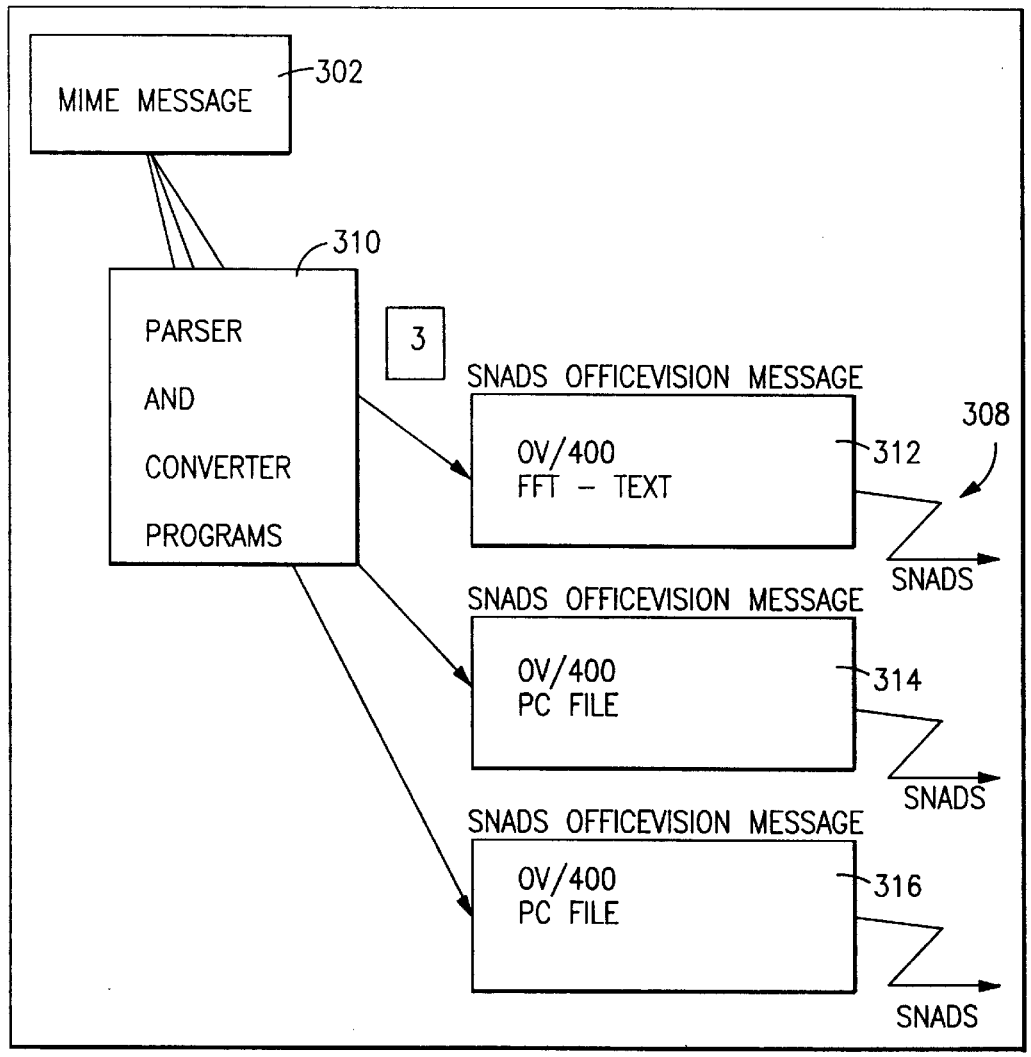
FIG. 6 illustrates changes in response to resolving this recipient without tunneling, and represents the state of the art prior to this invention.

Referring to FIG. 6, step 3 illustrates the prior art method for sending MIME mail across a SNADS network 308. It also illustrates what happens if a SNADS recipient of MIME mail message 302 is indicated to not be tunneled to by the tunnel-to attribute in address directory 304. Since the SNADS OfficeVision message form can not have more than a single attachment and it is not defined to contain ASCII or unformatted text, MIME message 302 is first parsed by parser and converter programs 310 to find the text attachments and/or non-text attachments (images, sound, etc.). Then the text attachments must be converted from ASCII to EBCDIC form and the text reformatted to appear as an OfficeVision FFT (final formatted text) form document 312. Each attachment of the original MIME message 302 that is not text is unencoded (if encoded in the MIME note 302) and then placed in its own SNADS OfficeVision message 314, 316 as a PC file. (Non-text files are assumed by OfficeVision to be binary data, such as would originate from a personal computer (PC).) These SNADS OfficeVision messages 312, 314 and 316 are then sent via SNADS network 308 to the recipients of the messages. As illustrated, a single MIME message 302 could result in many SNADS messages 312, 314 and 316 in the state of the art support.

Figure 7:
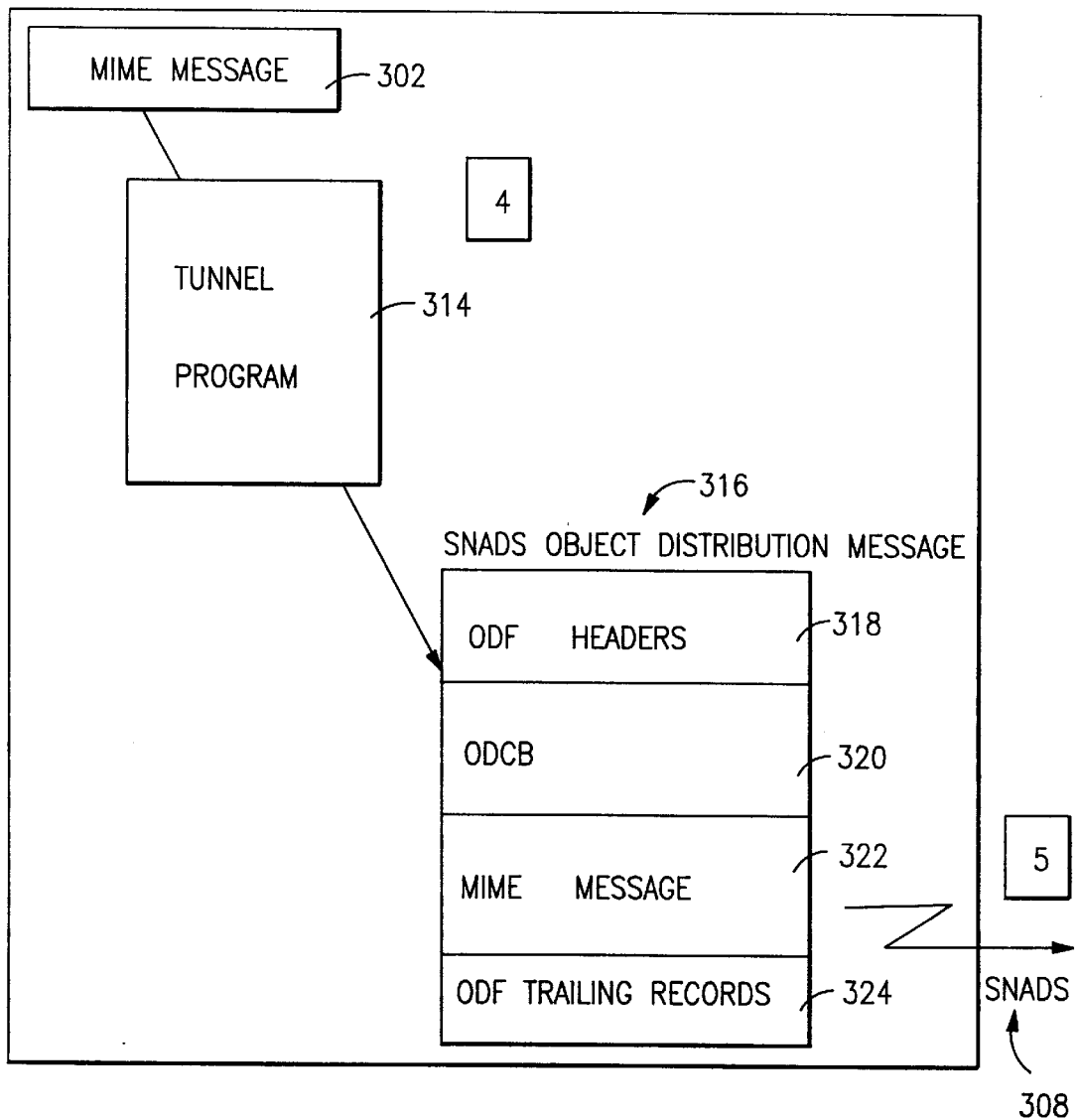

Referring to FIG. 7, step 4 illustrates the process of tunneling the MIME message that is initiated when an e-mail recipient of that message is configured in address directory 304 with a tunnel-to attribute. Tunnel program 314 is invoked to perform the MIME message encapsulation required to tunnel through the SNADS network. This program intially creates the portion of a SNADS object distribution function (ODF) format message 316 that includes ODF headers 318, ODF trailing records 324, and an object distribution control block (ODCB) 320 as part of the SNADS message.

In accordance with this invention, ODCB 320 appears just as would any ODCB in a SNADS ODF message 316 created by an ODF function when sending a database file. This includes an indicator that ODF SNADS message 316 contains a database file and includes the file name of the file object as it was originally sent. In this instance, ODCB 320 contains a fixed file name of, for example, QZDTUNNE, to indicate that this specific ODF message 316 is not transporting a database file object but is actually constructed to tunnel MIME message 302 across SNADS network 308.

Since SNADS ODF database files are not required to have any specific form of data (and therefore are treated as "binary", or unformatted, data), the remainder of SNADS ODF message 316 is constructed with MIME message 302 in field 322. There is no transformation of message 302, as was true of the prior art. Instead, MIME message 302 is packed (moved) into ODF SNADS message 316 so as to appear as a series of database records in field 322, similar to a series of database records read from a database file and sent using ODF. This packed data in field 322 may possibly be seen by another system that understands ODF messages with database files but that does not recognize message 316 as a tunneled MIME message. Thus, it is essential that ODF message 316 be built such that no problem occurs if message 316 is delivered to a recipient node that treats it as a "real" ODF database file. This specific method of encapsulation represents an improvement in the state of the art, such that a SNADS network does not and need not recognize tunneled MIME messages as being different than any "normal" SNADS ODF message.

Step 5 illustrates a tunneled MIME message 302, now encapsulated within message 316 and conforming to the form of all ODF SNADS messages being sent via SNADS network 308 to another SNADS system or systems.

Figure 8:
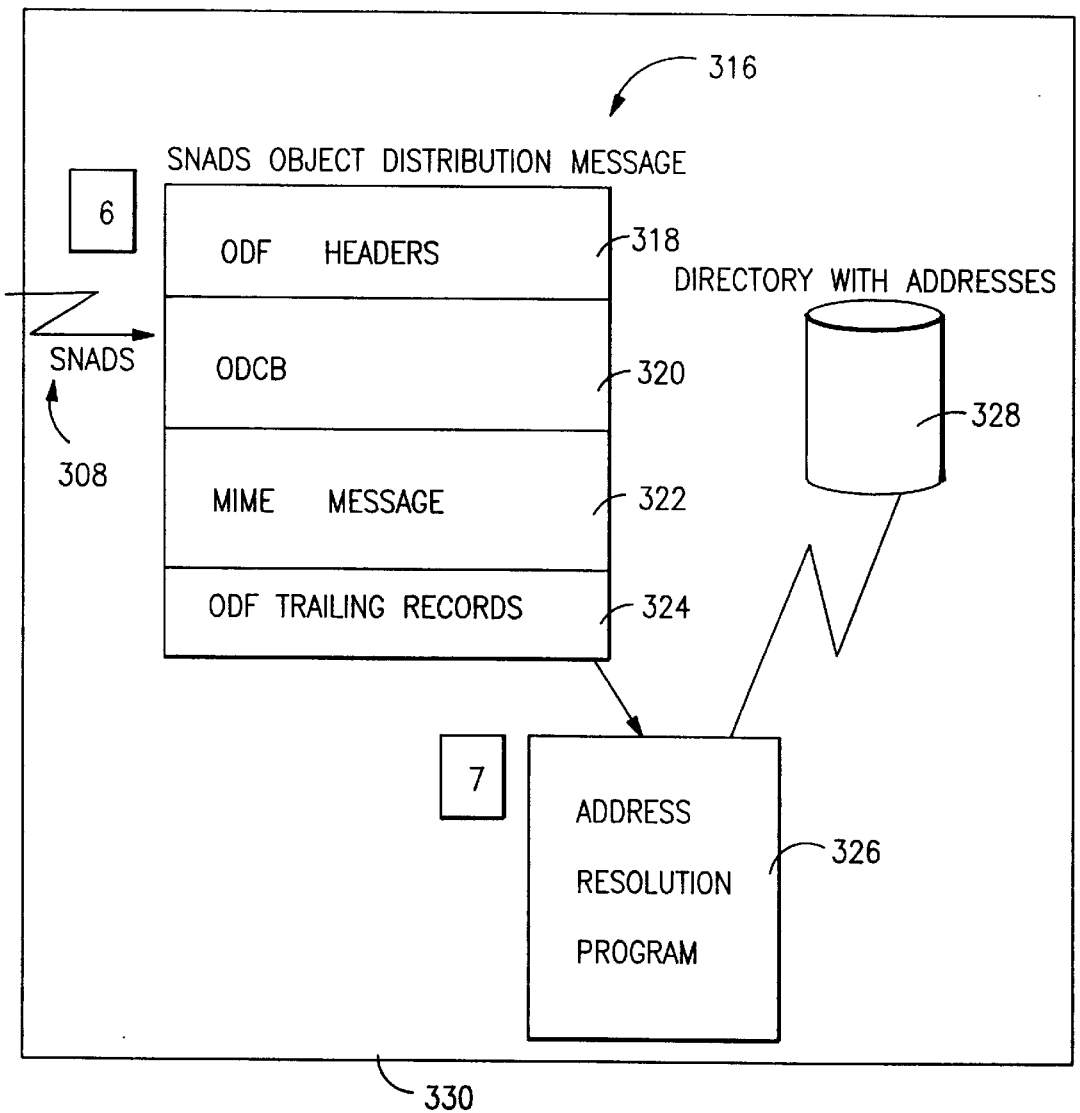
FIG. 8 illustrates identification of a tunneled message, and illustrates address resolution using a system distribution directory.

Referring to FIG. 8, step 6 illustrates the arrival from SNADS network 308 (from another system) of an ODF SNADS message 316 that contains a tunneled MIME message 322 for untunneling.

In step 7, SNADS directory 328 is accessed by address resolution program 326 to determine if the SNADS message 316 recipient is local to this system 330. The remaining untunneling steps are performed only when there is at least one message 316 recipient that, according to directory 328, is local. ODF SNADS message 316 will be forwarded (not shown) onward to any recipients that are not local.

Figure 9:
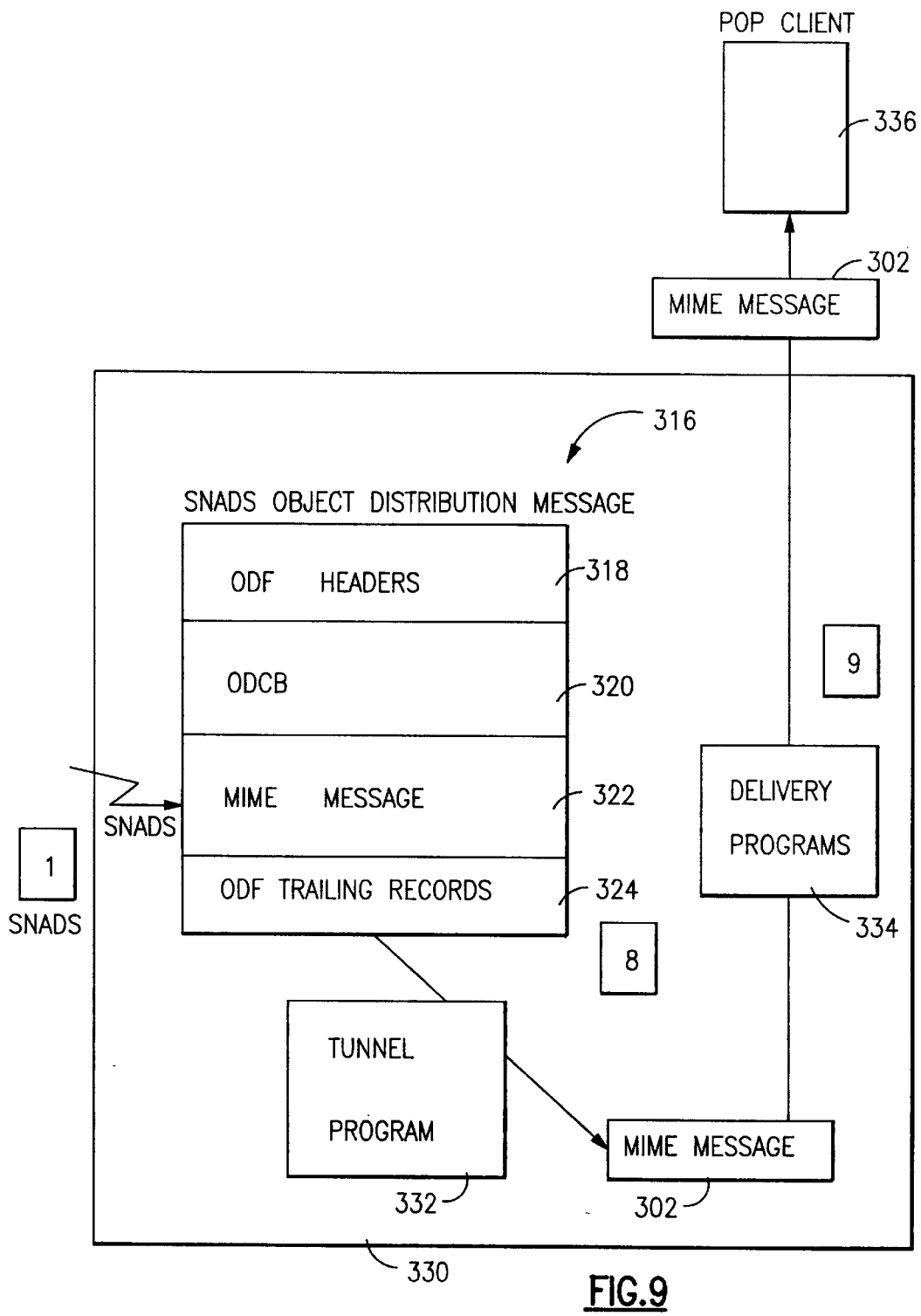
FIG. 9 illustrates unpacking of a tunneled file server object attachment and the delivery of a tunneled MIME message.

Referring to FIG. 9, step 8 illustrates the process that occurs when at least one of the recipients of SNADS ODF message 316 is local. If the ODF message ODCB 320 indicates that this is an ODF message being used to transport a database file, and the name in the ODCB is, in this example, QZDTUNNE, then tunnel program 332 is invoked to untunnel the MIME message 322 by pulling MIME message 322 from its place in SNADS ODF message 316 and recreating a whole MIME message 302 on receiving system 330.

Step 9 illustrates delivery programs 334 being invoked to perform the last step in delivering the tunneled MIME message 302 to local POP3 recipient 336.

Not shown is a similar result where a tunneled MIME message is detected and untunneled as illustrated in step 8 but is subsequently delivered to at least one local OfficeVision user. In this case, the final step is to parse and transform the tunneled MIME message after it is untunneled. The result is similar to the prior art in that there would be a transformed text attachment into the OfficeVision FFT format in EBCDIC (from ASCII) characters. Also, if the tunneled MIME message contained multiple non-text attachments then each of these would be unencoded and then delivered to the local OfficeVision recipient as a separate PC file OfficeVision message.

Advantages over the Prior Art

Advantages of the system and method of the preferred embodiment of this invention include:

Prior to this invention, SNADS ODF distributions were used solely to carry objects sent via the SNADS ODF functions. SNADS tunneling in accordance with this invention adds to that objects that contain the ASCII SMTP/MIME messages. To any system that does not support the tunneling technology of this invention, these objects will appear as if they originated as any other database file sent with an ODF function from an AS/400 or came across a bridge product to SNADS as a "file object".

In this sense SNADS tunneling is "safe". Should an ODF distribution with a tunneled MIME message arrive at a system that doesn't support tunneling or isn't configured correctly, SNADS will handle that distribution as it would an ordinary ODF "file" distribution. The ODF "file" with the ASCII MIME message content will be put in the ODF recipient's queue as would any other file data object sent via ODF.

Lastly SNADS tunneling is also "safe" in the sense of protecting POP3 clients from ODF senders. SNADS ODF user could use an ODF command to send, for example, an AS/400 spool file directly to a UserID.Address from anywhere in the SNADS network. The sender might not be aware that the UserID.Address sent to represents a POP3 client at the destination SNADS system. SNADS will handle this ODF distribution "correctly". The tunneling aspect of an ODF distribution is done in a way so that it is completely ignored by anything that might touch that distribution as part of a SNADS, ODF, or bridge function. It is treated as any other ODF "data file" distribution. Since the ASCII MIME message content is "hex" data and is neatly packed within the ODF distribution's server object, this message is treated as so much odd byte stream data. The ODF distribution's server object has a peculiar property that it contains an ODF description known as an "ODCB" or Object Distribution Control Block. Effectively that property makes ODF server object content "self defining". That is why it can be tunneled though MVS and come out again looking like the same ODF SNADS distribution.

Alternative Embodiments

It will be appreciated that, although specific embodiments of the invention have been described herein for purposes of illustration, various modifications may be made without departing from the spirit and scope of the invention.

In particular, it is possible that some of the process flows described in connection with FIGS. 3 through 16 may be combined. For example, multiple recipients of a single message may activate multiple snap-ins to act on the MSF message in concert. In accordance with this aspect of the invention, the snap-ins that support the existing handling of SNADS or POP3/MIME MSF messages are impacted and continue to produce the functions they are designed to produce without change.

Accordingly, the scope of protection of this invention is limited only by the following claims and their equivalents.

We claim:

1. Method for communicating a first message in a first format through a network transport requiring messages in a second format, comprising the steps of:
   at the application level of a sending node,
      generating said first message in said first format, said first format selectively comprising complex data;
      maintaining a directory of e-mail addresses including tunneling attributes configuring selective destination client and system E-mail addresses for tunneling, said attributes specifying the transport formats for destination addresses capable of accepting tunneled messages;
      responsive to an application request to send said first message to a first destination client:
         searching said directory of e-mail addresses for a first tunneling attribute including a first transport format for said first destination client; and
         responsive to said first tunneling attribute, encapsulating said first message without conversion within a second message of said first transport format;
      communicating said second message to said first destination client at a receiving node; and
      at said receiving node, de-encapsulating said second message to recover therefrom said first message.

2. A method for communicating messages in a plurality of predetermined transport formats, including SNADS and tunneled SNADS formats, comprising the steps of
   in the application level of a sending node:
      a) in a system directory, configuring destination recipient(s) to receive messages in a particular transport and format, including identifying selected recipients as tunnel-to-recipients;

b) identifying for a data message selectively including complex data to be transmitted from this sending node to a recipient node, the transport and format from said system directory; and c) for messages to a tunnel-to-recipient, encapsulating said data message as a tunneled message within the data segment of an encapsulated message including a control segment and a data segment, and including an object descriptor control block identifying this encapsulated message as a tunneled message;

transferring said encapsulated message to a recipient node; and in the application level of said recipient node:

e) determining if said encapsulated message is addressed to a recipient on this node;

f) responsive to said encapsulated message addressed to this node, determining from said descriptor control block that said encapsulated message contains a tunneled message;

g) de-encapsulating said encapsulated message to recover therefrom said tunneled message; and h) delivering said tunneled message to the recipient in-box.

3. A method for communicating messages in one or more predetermined formats, including SNADS and tunneled SNADS formats, comprising the steps of at the application level of a sending node:

a) in a system directory, configuring destination recipient(s) to receive messages in a particular transport and format (ie, SMTP, SNADS or tunneled SNADS), including identifying selected recipients as tunnel-to-recipients;

b) identifying for a message selectively including complex data to be transmitted from this sending node to a recipient node, the transport and format from said system directory; and c) for MIME ASCII messages to a tunnel-to-recipient, encapsulating the MIME message to create a SNADS message of an ODF type to include a control segment and a data segment, with the MIME message in part of the data segment, and an object descriptor control block identifying this SNADS message as a MIME message and including that descriptor block in both said data segment and said control segment;

transferring said SNADS message to a recipient node; and at the application level of said recipient node:

e) determining if said SNADS message is addressed to a recipient on this node;

f) responsive to a SNADS message addressed to this node and responsive to said object descriptor control block, detecting said SNADS message as containing a tunneled message including an ASCII MIME note in ODF format;

g) de-encapsulating said SNADS message to recover therefrom said MIME ASCII message; and h) delivering said MIME ASCII message to the recipient in-box;

thereby (a) maintaining message fidelity by not converting a MIME message from ASCII to EBCDIC and back to ASCII, or breaking said message into several separate notes or files which must be encoded and decoded, and (b) not requiring that the network handle SMTP as a messaging transport.

4. System for communicating a first message in a first format through a network transport requiring messages in a second format, said system including an application level and a transport level, said application level comprising:

means for generating a first data message, said first data message selectively including complex data;

a system directory of E-mail addresses including tunneling attributes configuring selective destination client addresses for tunneling;

means responsive to a message including a destination address for searching said system directory for the corresponding tunneling attribute; and means responsive to said tunneling attribute configuring said destination address for tunneling for encapsulating said first message selectively including said complex data within a message of the second format.

5. The system of claim 4 further comprising at the application level of a destination node:

a system directory including E-mail addresses of local recipients;

means responsive to a received message of said second format including a recipient address for determining from said system directory if said recipient is a local or a remote recipient;

means responsive to said received message for a local recipient for determining if said received message is a tunneled message; and means responsive to the determination that said received message is a tunneled message for untunneling said first message.

6. A system for communicating messages in a plurality of predetermined formats, including SNADS and tunneled SNADS formats, comprising:

a system directory, including for each of a plurality of configured destination recipients a message tunnel-to attribute configuring selective destination client addresses for tunneling;

an application level, said application level including:

means accessing said system directory for identifying the message tunnel-to attribute for the recipient node for a first message selectively including complex data to be transmitted from this sending node; and for messages to a tunnel-to-recipient, means for encapsulating said first message as a tunneled message within the data segment of an encapsulated message including a control segment and a data segment, and including an object descriptor control block identifying this encapsulated message as a tunneled message.

7. The system of claim 6 further comprising at the application level of a destination node:

a system directory of e-mail addresses for recipient clients including location attributes and address preference attributes;

means for receiving a message in a first format including a data segment and a control segment;

means responsive to said received message for determining from said system directory if said message is directed to a recipient client at said destination node and for determining from said control segment if said received message contains a tunneled message;

and means responsive to a received message including a tunneled message and directed to said recipient client at said destination node for de-encapsulating said received message to recover therefrom said tunneled message.

8. A memory module for storing digital signals adapted to operate a system to communicate a first message in a first format through a network transport requiring messages in a second format, comprising digital signals operable to execute within the application level of said system:
- a system directory of e-mail addresses including tunneling attributes configuring selective destination client addresses for tunneling, said attributes specifying the transport formats for destination addresses capable of accepting tunneled messages;
- means responsive to a message including a destination address and selectively including complex data for searching said system directory for the corresponding tunneling attribute and a first transport format; and
- means responsive to said tunneling attribute configuring said destination address for tunneling for encapsulating said first message within a message of said first transport format.

9. The memory module of claim 8 further comprising: digital signals operable to execute at the application level of a destination node:
- a system directory of e-mail addresses including location attributes;
- means responsive to a received message of said second format including a recipient address for determining from said system directory if said recipient is a local or a remote recipient;
- means responsive to said received message for a local recipient for determining if said received message is a tunneled message; and
- means responsive to the determination that said received message is a tunneled message for untunneling said first message.

* * * * *